United States Patent [19]
Fan

[11] Patent Number: 6,101,285
[45] Date of Patent: Aug. 8, 2000

[54] FILTER FOR PRODUCING CONTINUOUS TONE IMAGES FROM HALFTONE DIGITAL IMAGES DATA

[75] Inventor: Zhigang Fan, Webster, N.Y.

[73] Assignee: Xerox Corporation, Stamford, Conn.

[21] Appl. No.: 09/046,018

[22] Filed: Mar. 23, 1998

[51] Int. Cl.[7] .................................. G06K 9/40; H04N 1/40

[52] U.S. Cl. .......................... 382/260; 382/254; 358/455; 358/456

[58] Field of Search .................................. 382/254, 260, 382/261, 262, 263, 264; 358/455, 456, 457, 458

[56] References Cited

U.S. PATENT DOCUMENTS

| | | | |
|---|---|---|---|
| 4,194,221 | 3/1980 | Stoffel | 358/283 |
| 4,630,125 | 12/1986 | Roetling | 358/280 |
| 4,841,377 | 6/1989 | Hiratsuka et al. | 358/283 |
| 5,027,078 | 6/1991 | Fan | 358/456 |
| 5,243,444 | 9/1993 | Fan | 358/456 |
| 5,339,170 | 8/1994 | Fan | 358/456 |
| 5,343,309 | 8/1994 | Roetling | 358/455 |

OTHER PUBLICATIONS

Micelli, C. M. and Parker, J. Inverse Halftoning, Journal of Electronic Imaging vol. 1, No. 2, pp. 143–151, Apr. 1992.

Schweizer, S. and Stevenson, R. Bayesian Approach to Inverse Halftoning, Proc. of SPIE Conf. on Human Vision, Vis. Proc. and Dig. Display IV, Proc. SPIE 1913, pp. 282–292, 1993.

Kim, Y., Arce, G. R. and Grabowski, N. Inverse Halftoning Using Binary Permutation Filters, Proc. IEEE Trans. Image Processing, vol. 4, pp. 1296–1311, Sep. 1995.

Chen, L. M. and Hang, H. M. An Adaptive Inverse Halftoning Algorithm, IEEE Trans. on Image Processing, vol. 6, No. 8, pp. 1202–1209, 1997.

Wong, P. W. Inverse Halftoning and Kernel Estimation for Error Diffusion, IEEE Trans. Image Processing, vol. 4, No. 4 pp. 486–498, Apr. 1995.

*Primary Examiner*—Thomas D. Lee

[57] ABSTRACT

A method and apparatus for processing halftone digital image data to generate a corresponding continuous tone image is disclosed. More specifically, the present invention discloses a method and apparatus for filtering a halftone image in two directions which enables images to be smoothed in the flat regions, while reducing smoothing along edges of the image and eliminating smoothing altogether in the ridges and valleys. This provides for a significant improvement in image quality without losing the fine details that are often lost using standard filtering techniques.

13 Claims, 10 Drawing Sheets

316

$$y(m,n) = \alpha x^*(m-Tx,n) + (1-\alpha)x^*(m,n) \text{ WHEN } |\text{dif0}| \leq |\text{dif1}|$$
$$= \alpha x^*(m+Tx,n) + (1-\alpha)x^*(m,n) \text{ OTHERWISE}$$

$$y(m,n) = \alpha x^*(m,n-Tx) + (1-\alpha)x^*(m,n) \text{ WHEN } |\text{dif0}| \leq |\text{dif1}|$$
$$= \alpha x^*(m,n+Ty) + (1-\alpha)x^*(m,n) \text{ OTHERWISE}$$

FIG. 7B

FILTER FOR PRODUCING CONTINUOUS TONE IMAGES FROM HALFTONE DIGITAL IMAGES DATA

The present invention is directed to a method and apparatus for processing halftone digital image data to produce a corresponding continuous tone image. More specifically, the invention includes subjecting a halftone image to filtering in two directions. As a result of this bidirectional filtering, images may be smoothed without losing the fine details contained therein.

BACKGROUND OF THE INVENTION

Hardcopy images, such as those obtained by silver halide photography or standard lithographic processes, are typically provided in continuous tone form. However, many images are provided in halftone form i.e. pictures contained in newspaper or magazine articles as well as several types of image files that are stored in computer memory. Halftone images are binary images that have pixels that are either turned on or off. The image is printed by enabling or withholding the application of ink at locations on the copy sheet that correspond to the output of each pixel. Unfortunately, direct printing of a halftone image that has been acquired such as by scanning or similar methods is usually not desired. Moire, distortions and other artifacts are often introduced when image processing operations such as scaling, enhancement and re-halftoning are performed on halftone images. Because of this, the halftone image is usually converted to a continuous tone image, subjected to appropriate image processing, and then reconverted to a halftone image for printing. Image processing systems used with printers in reprographic systems typically require capability to convert halftone images to continuous tone images to meet these conversion and reconversion needs, to enable processing by any of a large variety of enhancement algorithms commonly available for continuous tone images. These processes are essentially estimation processes resulting in some loss of information since they cannot be reversed exactly to reproduce an image that has an exact correspondence to the original image. However, just as a halftone or dithered digital image gives a visual impression of a gray, it is possible to approximate the original continuous tone digital image using reconstructive methods.

It is a generally known procedure to reverse the digital halftone process in order to approximate a continuous tone digital image. One traditional method of reversing the halftoning process is through the application of a low-pass filter to the binary image data. Generally speaking, low-pass filter methods cannot maintain the fidelity of the edge information contained in the original image and in fact may blur edges and introduce artifacts into the continuous tone output image.

The following disclosures may be relevant to aspects of the present invention:

U.S. Pat. No. 4,194,221 to Stoffel issued Mar. 18, 1980 discloses an image data handling system to automatically detect and segregate from a stream of image pixels high frequency half-tone image input, continuous tone image input, low frequency half-tone image input, and line image input which may be present in the pixel stream. The image pixels are first autocorrelated in accordance with a predetermined algorithm to detect if high frequency half-tone image data is present. Data of this type found is processed by first descreening and then rescreening at a lower frequency to provide binary level pixels. The pixel stream is analyzed for the presence of continuous tone image data. Where found, such data is processed by a template screening process to provide binary level pixels. Remaining pixels comprising low frequency half-tone and line copy image data are thresholded to provide binary level pixels.

U.S. Pat. No. 4,630,125 to Roetling issued Dec. 16, 1986 discloses a method of reconstructing a continuous tone image of grayscale values that have been converted to a halftone image of black and white spots. The conversion to the digital halftone image spots was by comparing each pixel of the continuous tone grayscale image to a periodic screen pattern and providing either a black or white spot based on the comparison. In particular, to reconstruct the continuous tone grayscale image from the halftone image, each spot of the halftone image is isolated along with a neighborhood of surrounding spots. For each neighborhood, the maximum screen pattern value producing a white spot is compared to the minimum screen value producing a black spot. If the minimum screen value giving a black spot is greater than the maximum screen value giving a white spot, then the grayscale pixel value of the isolated spot is the average of the maximum and minimum screen values. If the minimum screen value giving a black spot is less than the maximum screen value giving a white spot, then the process is repeated after deleting that portion of the neighborhood of surrounding spots containing the maximum or minimum screen value furthest from the isolated spot.

U.S. Pat. No. 4,841,377 to Hiratsuka et al. issued Jun. 20, 1989 discloses a continuous image estimation method of a binary image wherein only one scanning aperture satisfying a predetermined condition for each picture element of a continuous image to be estimated from a plurality of scanning apertures for each kind in a dither image formed of a dither matrix, and the continuous image is estimated on the basis of the number of white or black picture elements in the scanning aperture selected. The predetermined condition is that a gradation expression is conducted in a lower spatial frequency range by using larger scanning apertures and in a higher spatial frequency range by using smaller scanning apertures, and that for the coincidence between patterns of a dither image in the scanning aperture and a binary image, which is made binary with the dither matrix from a continuous image formed on the bases of the number of the white or black picture elements in the scanning aperture, the patterns being obtained by comparing the dither image and the binary image for each aperture.

U.S. Pat. No. 5,027,078 to Fan issued Jun. 25, 1991 discloses a method of unscreening a digitally created halftone image to reconstruct a continuous tone image, including the determination of the parameters of the halftone screen used to produce the halftone image, logically filtering the halftone image to determine approximate continuous tone levels, and optionally, smoothing the continuous tone levels of the reconstructed image to minimize the quantization errors introduced during the original screening or dithering process.

U.S. Pat. No. 5,243,444 to Fan issued Sep. 7, 1993 discloses an image processing system converts unscreened and other halftone images to continuous tone images. Value data is sequentially generated for successive pixels of a screened or unscreened halftone image. Each image pixel is Sigma filtered with a predetermined set of filter parameters including the filter window size and a Sigma difference range that is applied to determine which pixels in the filter window are counted in determining average window pixel values. An output continuous tone image containing the Sigma filtered pixels is generated for storage and/or processing to a halftone copy or print.

U.S. Pat. No. 5,339,170 to Fan issued Aug. 16, 1994 discloses an image processing system which converts screen structured halftone images to continuous tone images. Value data is sequentially generated for successive pixels of a halftone image. An averaging filter is provided for sequentially filtering each pixel in the halftone image in the horizontal image direction in accordance with a first predetermined filter to generate an intermediately filtered image. A pattern matching filter then sequentially filters each pixel in the intermediately filtered image in the vertical direction to generate a hybrid filtered image. The hybrid filter arrangement is then iteratively operated for three additional sets of orthogonal directions, i.e. the vertical and horizontal directions, a first diagonal direction and a second diagonal direction, and the second and first diagonal directions. The best hybrid image is generated as an output continuous tone image for storage and/or processing to a halftone copy or print.

U.S. Pat. No. 5,343,309 to Roetling issued Aug. 30, 1994 discloses an image processing system that converts halftone images to continuous tone images. It employs an adaptive filter which processes successive pixels in an input halftone image. The adaptive filter employs a filter that is selected under feedback control from a plurality of filter sets each having a plurality of filters. The halftone image is also low-pass filtered to generate a first approximation image (FAI). A spatial gradient value is computed for each pixel in the FAI. A control operates the adaptive filter to apply one of the predetermined filters to the current pixel as a function of the associated pixel spatial gradient. An output image from the adaptive filter in a first iteration of the filtering procedure can then be applied to the input of the adaptive filter for a second adaptive filtering iteration. Pixel gradients for the second iteration are computed from the image output from the first iteration. A predetermined number of iterations are performed and the image output from the last iteration is a continuous tone image for system output.

Micelli, C. M. and Parker, J. *Inverse Halftoninc,* Journal of Electronic Imaging Vol. 1 No. 2 pp. 143–151, April 1992.

Schweizer, S. and Stevenson, R. *Bayesian Approach to Inverse Halftoning,* Proc. of SPIE Conf. on Human Vision, Vis. Proc. and Dig. Display IV, Proc. SPIE 1913, pp. 282–292, 1993.

Kim, Y., Arce, G. R. and Grabowski, N. *Inverse Halftoning Using Binary Permutation Filters,* Proc. IEEE Trans. Image Processing, Vol. 4, pp. 1296–1311, September 1995.

Chen, L. M. and Hang, H. M. *An Adaptive Inverse Halftoning Algorithm,* IEEE Trans. on Image Processing, Vol. 6, No. 8, pp. 1202–1209, 1997.

Wong, P. W. *Inverse Halftoning and Kernel Estimation for Error Diffusion,* IEEE Trans. Image Processing, Vol. 4, No. 4 pp. 486–498, April 1995.

All of the references cited herein are incorporated by reference for their teachings.

Accordingly, although known apparatus and processes are suitable for their intended purposes, a need remains for a simple and efficient method and apparatus for converting halftone digital image data to continuous tone data.

SUMMARY OF THE INVENTION

In accordance with one aspect of the invention there is provided a method of generating a continuous tone image from halftone digital image data, comprising the steps of: acquiring the halftone digital image data; filtering the halftone image in two directions to produce a two dimensional filtered output; and outputting a continuous tone output image from said two-dimensional filtered output.

In accordance with another aspect of the invention there is provided a method of generating a continuous tone image from halftone digital image data, including the steps of: acquiring the halftone digital image data; filtering the halftone image in a first direction to produce a first filtered output image; filtering said first filtered output image in a second direction to produce a second filtered output; and outputting a continuous tone output image from said second filtered output.

In accordance with yet another aspect of the invention there is provided an apparatus for generating a continuous tone image from halftone digital image data, which includes: means for acquiring the halftone digital image data; means for filtering the halftone image in a first direction to produce a first filtered output image; means for filtering said first filtered output image in a second direction to produce a second filtered output; and means for outputting a continuous tone output image from said second filtered output.

The present invention deals with a common problem in digital image processing systems—reducing moire while simultaneously preventing smoothing in the detailed portions of an image. The invention includes a filter which detects the context in which it is operating in order to set its output. Thus, screen is only eliminated in the "flat regions" of the image, where moire is most visible, and smoothing is prevented in the busier areas.

BRIEF DESCRIPTION OF THE DRAWINGS

Other features and advantages of the present invention will become apparent as the following description proceeds and upon reference to the drawings, in which:

FIG. 7A illustrates one implementation of the first portion of the two-dimensional filter shown in FIGS. 3 and 4.

FIG. 7B illustrates one implementation of the second portion of the two-dimensional filter shown in FIG. 5 and 6.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for processing halftone digital image data to output a corresponding continuous tone image to a printer, computer storage, display monitor or other output device by filtering the image in two directions. This allows images to be smoothed without losing the fine details contained therein.

Figure 9:
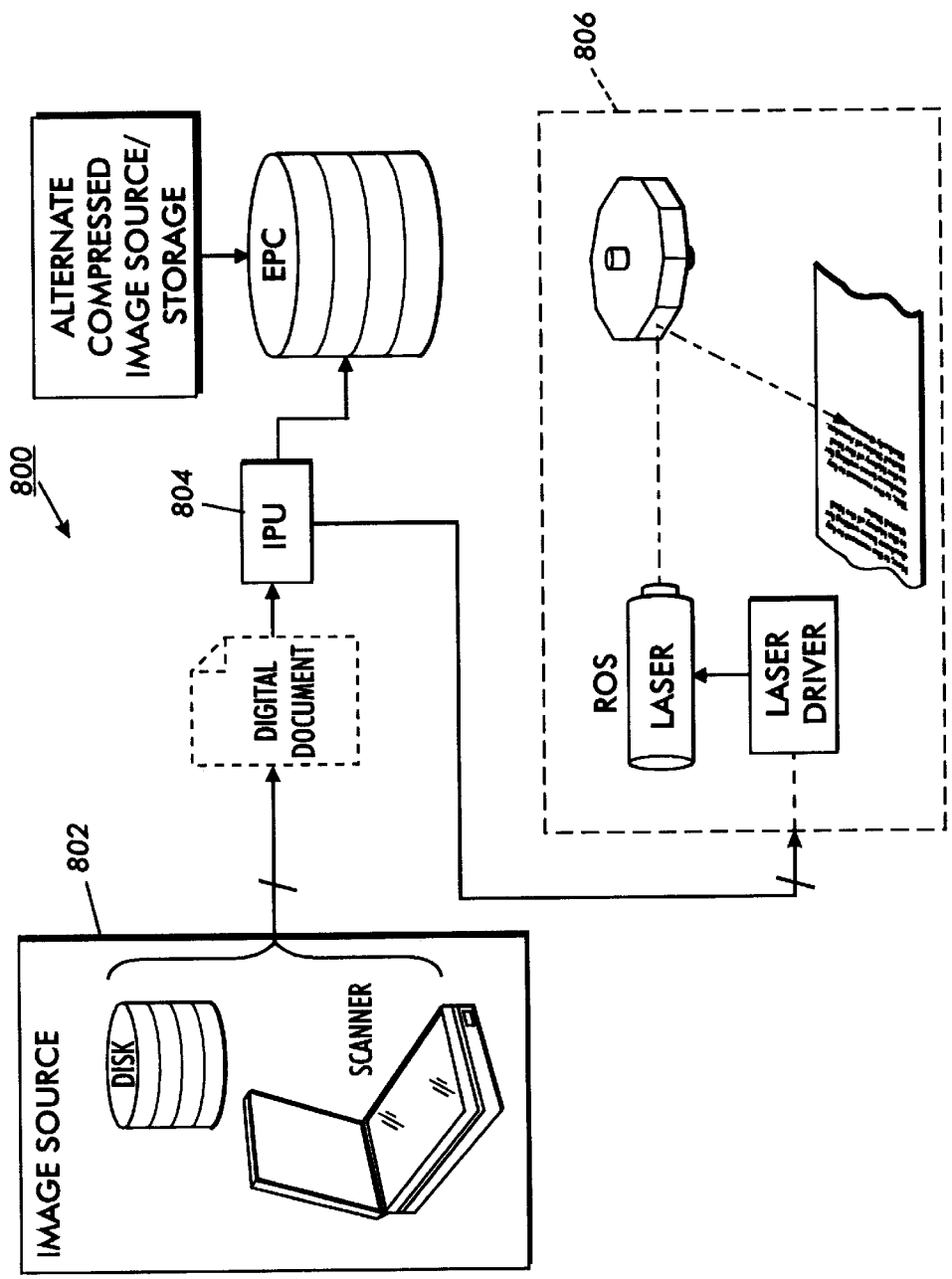
FIG. 9 contains a schematic diagram illustrating generally the components of an imaging system with which the present invention may be used.

Referring now to the drawings where the showings are for the purpose of describing an embodiment of the invention and not for limiting same, FIG. 9 illustrates one example of an imaging system 800 that may be used with the present invention. System 800 consists of three main parts: an image source 802, which may include a scanner, a source of PDL (description language, i.e. PostScript) files or a similar image acquisition device; an image processing unit (IPU) 804, which performs various image processing operations; and an output device 806, which receives data from the IPU and produces a viewable image or paper copies of the image. While the invention is described using a scanner as image source 802 and a printer as output device 806, other input sources and output devices are possible within the scope of this invention. In fact it will become evident from the following discussion that the present invention is equally well suited for use in a wide variety of copying and printing systems, including color scanners coupled with printing systems, image memory storage systems and other devices, and therefore are not limited in application to the particular systems shown herein.

Figure 1:
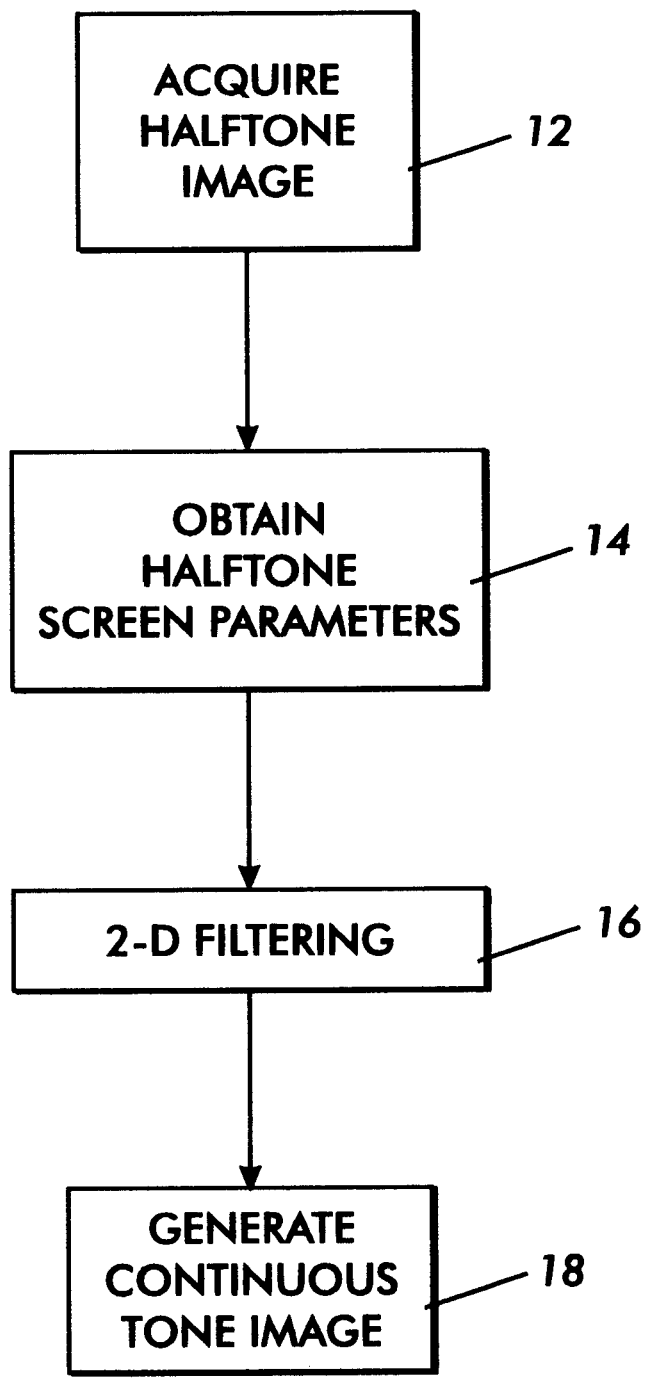
FIG. 1 is a generalized block diagram illustrating the steps required to use the present invention.

FIG. 1 contains a block diagram depicting illustrating the major processing blocks of the method of the present invention. As shown, halftone digital image data must first be acquired from image source 802 (FIG. 9) as shown in block 12. One way in which the present invention has shown to be used successfully is when an original halftone image such as that obtained from a newspaper or magazine is acquired by image source 802. However the invention may be used when halftone image data is obtained by acquiring and digitizing a continuous tone image, and is not limited to this embodiment.

Halftone screen parameters are next obtained for the image as shown in block 14. The halftone screen parameters needed to properly process a halftone digital image using the present invention include screen frequency as described above, as well as the dimensions of the halftone cell in two directions, the shift parameter and halftone dot threshold values. These parameters may either be known prior to implementation of the invention, or they may be estimated during operation using known techniques such as disclosed in U.S. Pat. No. 4,194,211 to Stoffel or in U.S. Pat. No. 4,811,115 to Yin et al. In one embodiment of the invention, the image had a screen frequency of two to five pixels per dot. However the invention is not limited to this range and numerous other values may be used. A rectangle that measures $T_x \times T_y$ (with x and y indicating the horizontal and vertical distances respectively) is used to describe a single a screen period.

Figure 2:
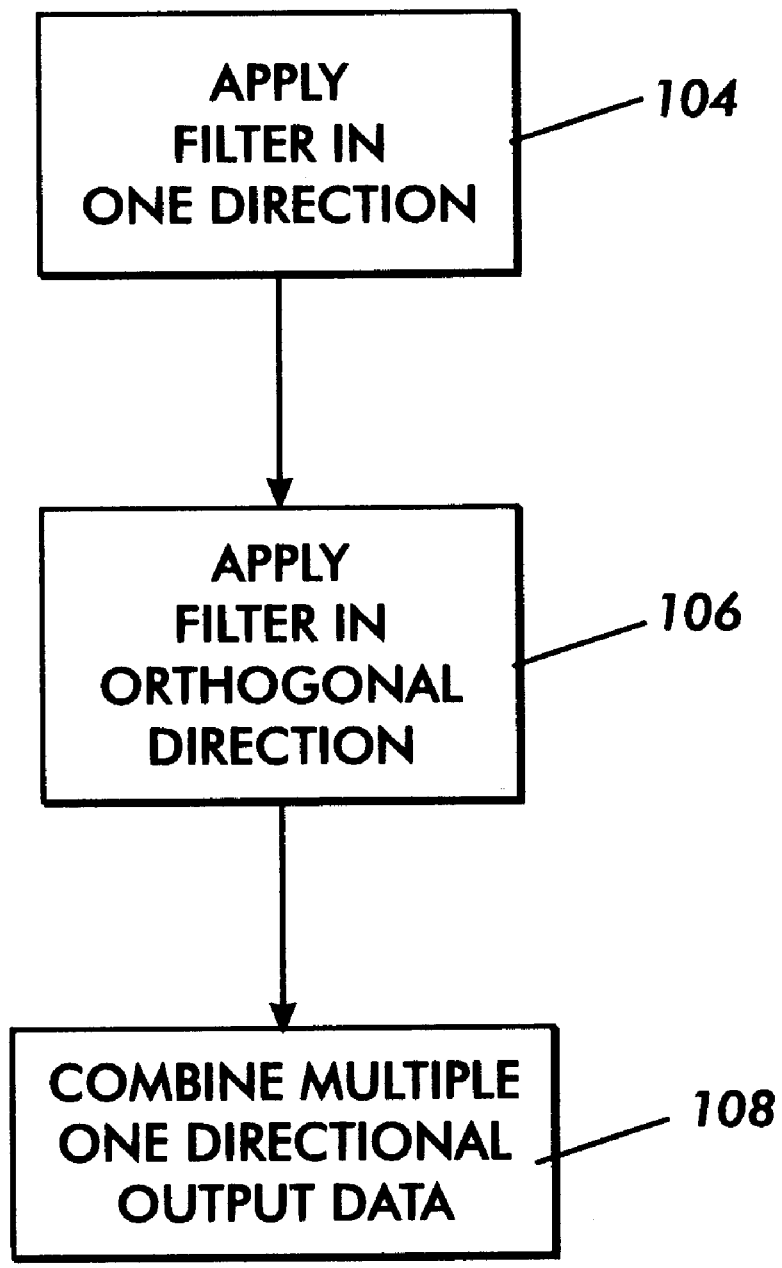
FIG. 2 is a generalized block diagram which depicts the use of the two-dimensional filter included with the present invention.

The present invention includes filtering the halftone image to produce a two dimensional filtered output, as shown in block 16. This two dimensional output is used to create a continuous tone image as indicated in block 18. Referring to FIG. 2, during filtering the halftone image is decomposed to a pixel level and analyzed to allow approximation of the original continuous tone pixels. In the preferred embodiment, the two dimensional filtered output of block 16 is generated by first operating a one-dimensional filter on the halftone digital image data in one direction as indicated in block 104 and then operating a one-dimensional filter on the output of this filter in a second direction as shown in block 106. While these two directions will often be referred to as "horizontal" and "vertical," it should be appreciated that these terms do not imply any required relationship between the configuration of the original image and the filtering directions. While the filter directions will often be orthogonal, this is not required either. Further, filtering of the provided image can begin in either direction. That is, the image may be filtered first in the horizontal direction and the results thereof may then be filtered in the vertical direction, or the image may be filtered in the vertical direction first, and those results may then be filtered in the horizontal direction. In addition, while the output image will always be two-dimensional, actual filtering in both directions is not required. Thus, it is possible to inhibit the filtering process in either direction such that the final output in that direction is equal to its input. The bidirectional filtered output produced using the present invention enables a continuous tone output image to be reproduced on an output device such as a printer or computer monitor, or for storage in a computer memory.

Figure 3:
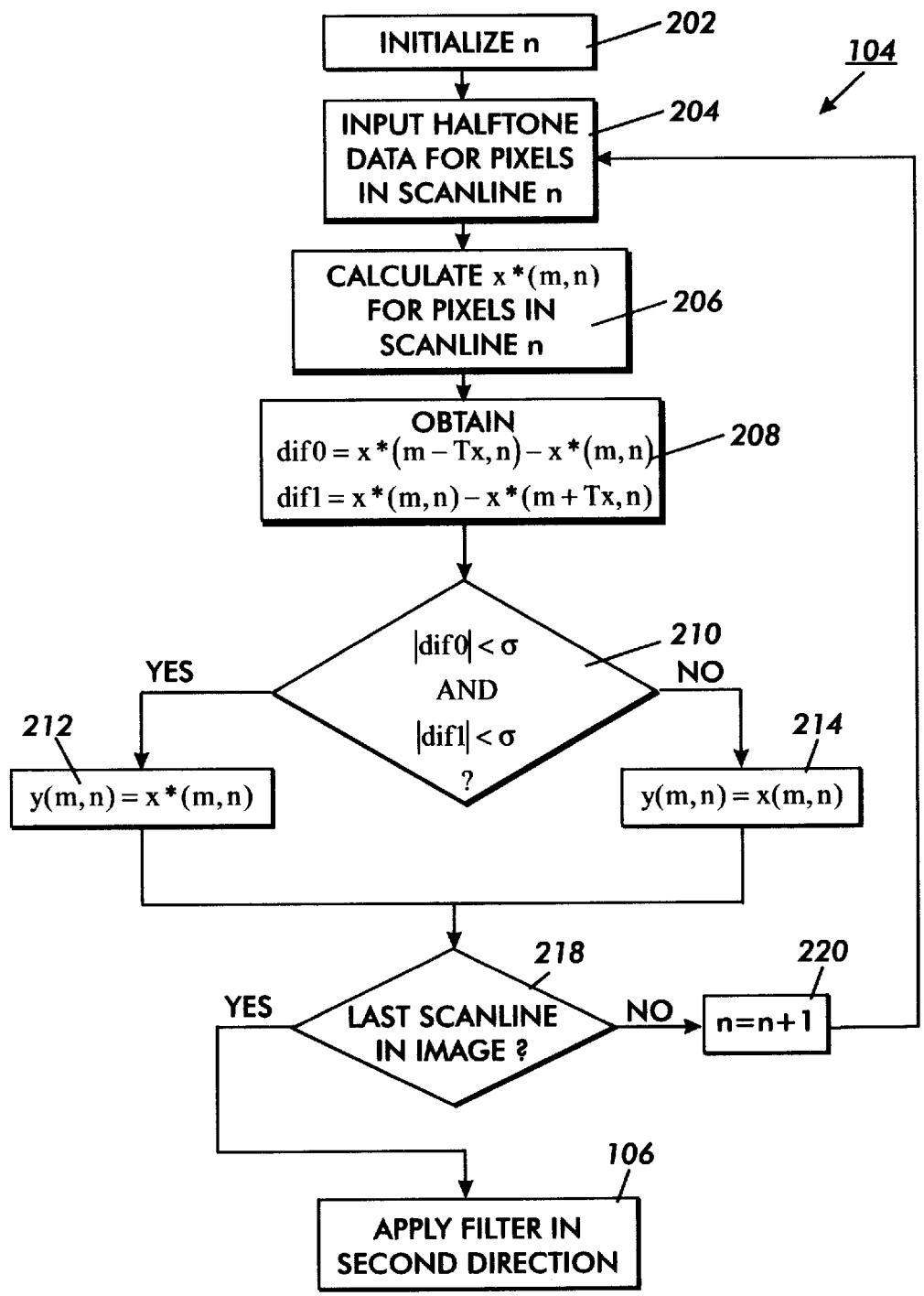
FIG. 3 contains a detailed block diagram illustrating one embodiment of the steps that may be used to implement the first portion of the filter shown in FIG. 2.

Referring now to FIGS. 3 through 6, detailed flow charts which explain two embodiments of the operation of the bidirectional filters will now be described. When the image has not been filtered in either direction, the process begins by applying filter 104 as described in the embodiments described with reference to either FIG. 3 or FIG. 4. Referring first to FIG. 3, scanline counter n is initialized at step 202. Halftone image data which includes gray level values for each pixel in scanline n is input as indicated in step 204. Functions $x(m,n)$ and $y(m,n)$ define the input and output of the filter at pixel $(m,n)$.

Figure 8B:
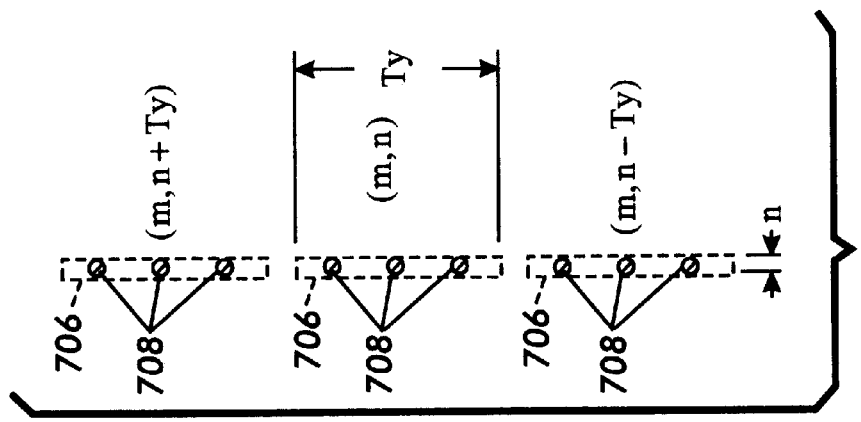
FIG. 8B illustrates a section of a typical scanline denoting pixel and pseudo-window locations for data that is screened in a direction orthogonal to that in FIG. 8A.
Figure 8A:
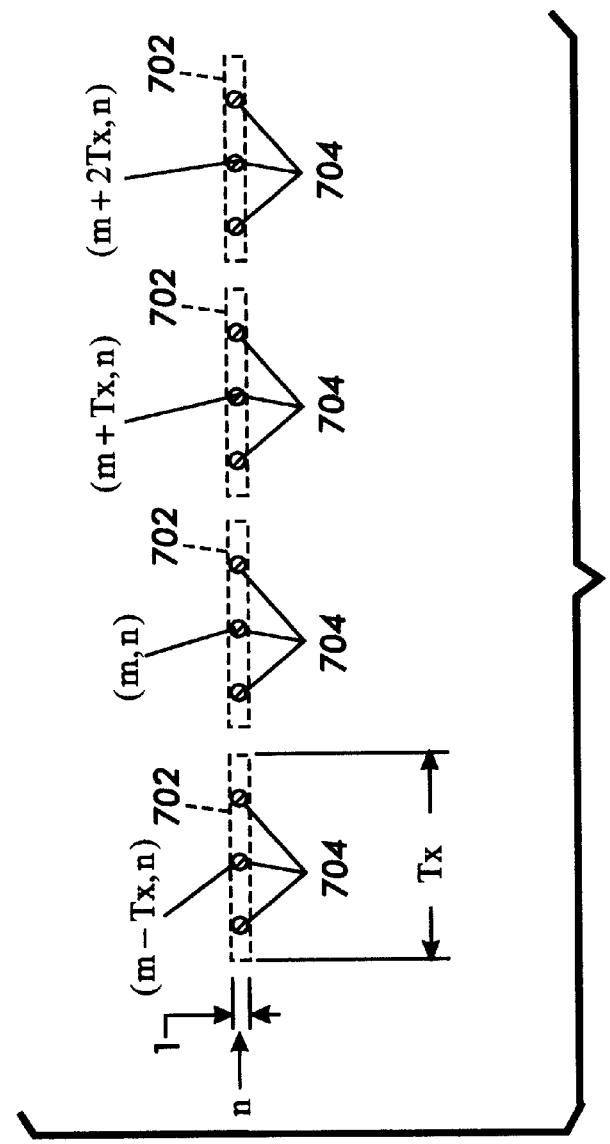
FIG. 8A illustrates a section of a typical scanline denoting pixel and pseudo-window locations.

Referring for a moment to FIG. 8A, in order to practice the invention an imaginary or "pseudo" window 702 is first drawn around each pixel 704 in the scanline. Each pseudo-window 702 has a width $T_x$, a height equal to that of one pixel, and is centered at pixel 704.

Turning back to FIG. 3, for each pseudo-window 702 that surrounds pixel 704, the averaged gray level input value $x^*(m,n)$ is calculated, as indicated in block 206. The differences between the averaged input values lo for adjacent pixels are then calculated as indicated in block 208. In other words, for a selected pixel $(m,n)$ two difference values must be obtained, one for each pixel adjacent to pixel $(m,n)$ within the same scanline:

$$dif0 = x^*(m-T_x,n) - x^*(m,n)$$

$$dif1 = x^*(m,n) - x^*(m+T_x,n)$$

The absolute values of both differences are then compared to a threshold value σ as shown in block 210. Threshold parameter σ is a measure of edge enhancement that will be applied to the image. It will often be set by the user, but it remains constant during processing of each single image. When σ is low, a substantial portion of the details in the image will be retained. But the trade off is that a lot of halftone noise will often remain in the image. A high a will cause a reduction in the amount of halftone noise, but will also result in smoothing and a loss of detail. If the absolute values of both differences dif0 and dif1 are less than the threshold value σ, then a has a relatively high value which indicates that pixel (m,n) is in a flat region of the image. Under these circumstances smoothing is desired, so output y(m,n) is set equal to x*(m,n) the averaged value of the pseudo-window input as indicated in block 212. If the absolute values of the differences are not both less than σ, pixel 704 is either on a ridge, in a valley, or on an edge. In one embodiment of the invention, the filter is simply turned off for these pixels and the output y(m,n) is set equal to x(m,n) as indicated in block 214. In another embodiment, the more precise location of the "non-flat region" pixels i.e. edge, valley/ridge may be determined, and the output is set depending upon that location. This embodiment is illustrated in FIG. 4, and will be described in detail later.

Still referring to FIG. 3, once the output y(m,n) has been set equal to either the averaged value over the pseudo-window (flat region) or to the input value (non-flat region) whether all scanlines in the halftone image have been filtered must be determined as indicated in block 218. If not, the scanline counter is incremented and the halftone image data for the next line will be input as in block 204. The steps are repeated until output values for all scanlines have been obtained. When the last scanline n has been processed in the first direction, the output of the first direction filter is transmitted to filter 106 for processing in the second direction.

Figure 4:
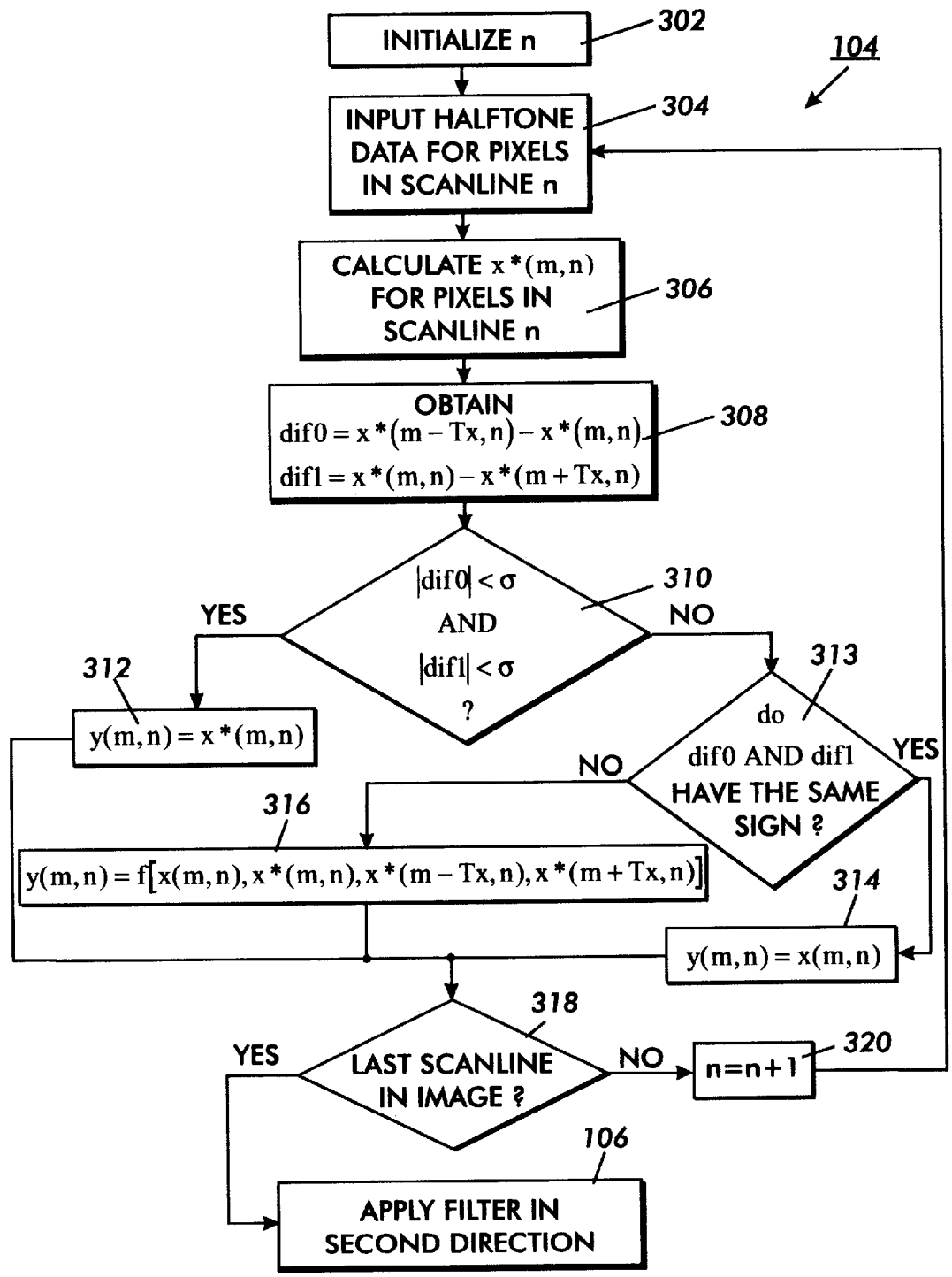
FIG. 4 contains a detailed block diagram illustrating a second embodiment of the steps that may be used to implement the first portion of the filter shown in FIG. 2.

Turning now to FIG. 4 as mentioned earlier, filter 104 may also be used to derive a more accurate setting for the output of the pixels that lie in the non-flat regions of the image. Once it has been determined that the absolute values of dif0 and dif1 are not both less than the threshold value σ as indicated in block 310, we must determine whether dif0 and dif1 have the same sign as shown in block 313. If both difference values have the same sign, pixel (m,n) is either in a ridge or in a valley. No smoothing is desired in these locations, and output y(m,n) is just set equal to the input x(m,n) for that pixel as shown in block 314. If dif0 and dif1 are not both less than σ AND do not both have the same sign, pixel (m,n) is on an edge of the image. Here some smoothing is desirable, but it must be accompanied by some form of edge enhancement. The output value y(m,n) for edge pixels is set equal to some function of the input value x(m,n) for the pixel (m,n), the averaged value x*(m,n) for the pseudo-window in which pixel (m,n) resides, and the averaged values x*(m−$T_x$, n) and x*(m+$T_x$, n) for adjacent pixels as indicated in block 316. As shown in FIG. 7A, in one embodiment of the invention, output values of edge pixels were set equal to:

$$y(m,n)=\alpha x^*(m-T_x,n)+(1-\alpha)x^*(m,n) \text{ when } |dif0| \le |dif1| \text{ and } \alpha x^*(m+T_x,n)+(1-\alpha)x^*(m,n) \text{ otherwise}$$

where α is a value between 0 and 1 that describes how much edge enhancement is to be applied once an edge has been identified. If α is equal to 0 no edge enhancement will take place. If α is at or near 1, the edges will be greatly enhanced.

The rest of the process illustrated in FIG. 4 continues as described with reference to FIG. 3. Thus, the scanline counter is incremented until all lines in the image have been processed, and the complete set of data from filter 104 is transmitted to the second filter 106.

Figure 10:
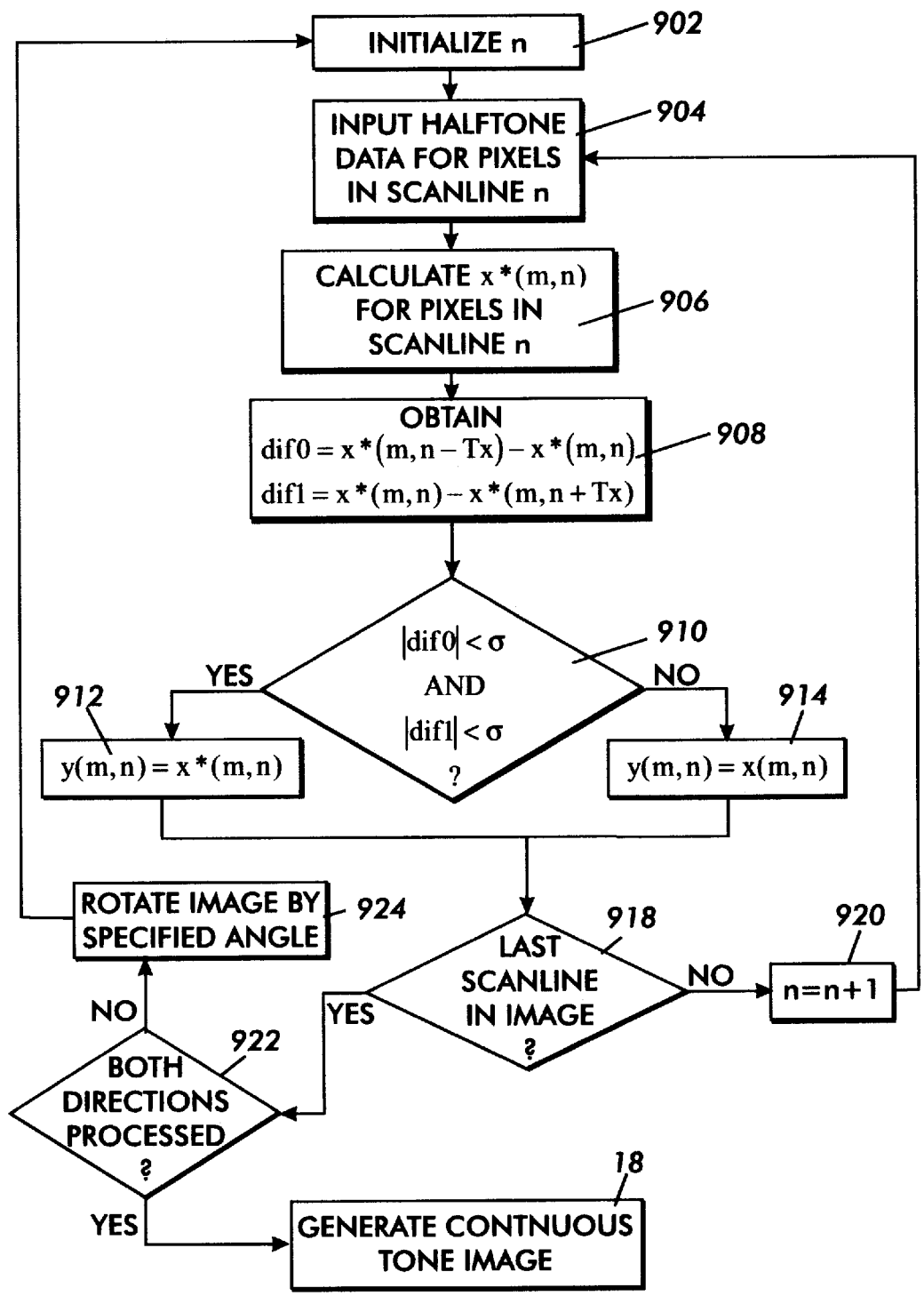
FIG. 10 depicts one embodiment of the present invention with filtering taking place in at least two directions using a single hardware implementation.

The operation of filters 104 and 106 are very similar. The differences are that the halftone data that is input to filter 106 is that which has been output from filter 104 and also, the continuous tone image is actually output after processing by filter 106. It should be noted here that filters 104 and 106 do not have to be implemented using separate hardware. Referring for a moment to FIG. 10, after the last scanline is processed at step 918, an inquiry can be made as to whether both directions have been processed as shown in block 922. If so, image processing may be halted to output the continuous tone image. If both directions have not been processed, the image can be rotated by the specified angle as shown in block 924 which, as stated before, may or may not be 90 degrees. Scanline counter n can then be initialized again and the new direction may be processed, with the scanline counter being used to count vertical columns or segments of pixels that are angled in the specified direction.

Those skilled in the art will also recognize that the embodiment of the invention described with reference to FIG. 10 enables the image to be filtered more than twice, simply by replacing the inquiry at block 922 with one that determines whether the image has been filtered a predetermined number of times. It is also possible to add a technique that determines the optimum number of filterings required based upon the characteristics of the image, and uses this information to filter the image the optimum number of times. It is intended to embrace these and other similar alternatives, and the invention is not limited to those embodiments described here. Also, while FIG. 10 clearly illustrates embodiments of the invention that are included in the descriptions of FIGS. 3 and 5, those skilled in the art will recognize that it may be implemented with embodiments described with reference to FIGS. 4 and 6, as well as other possibilities.

Figure 5:
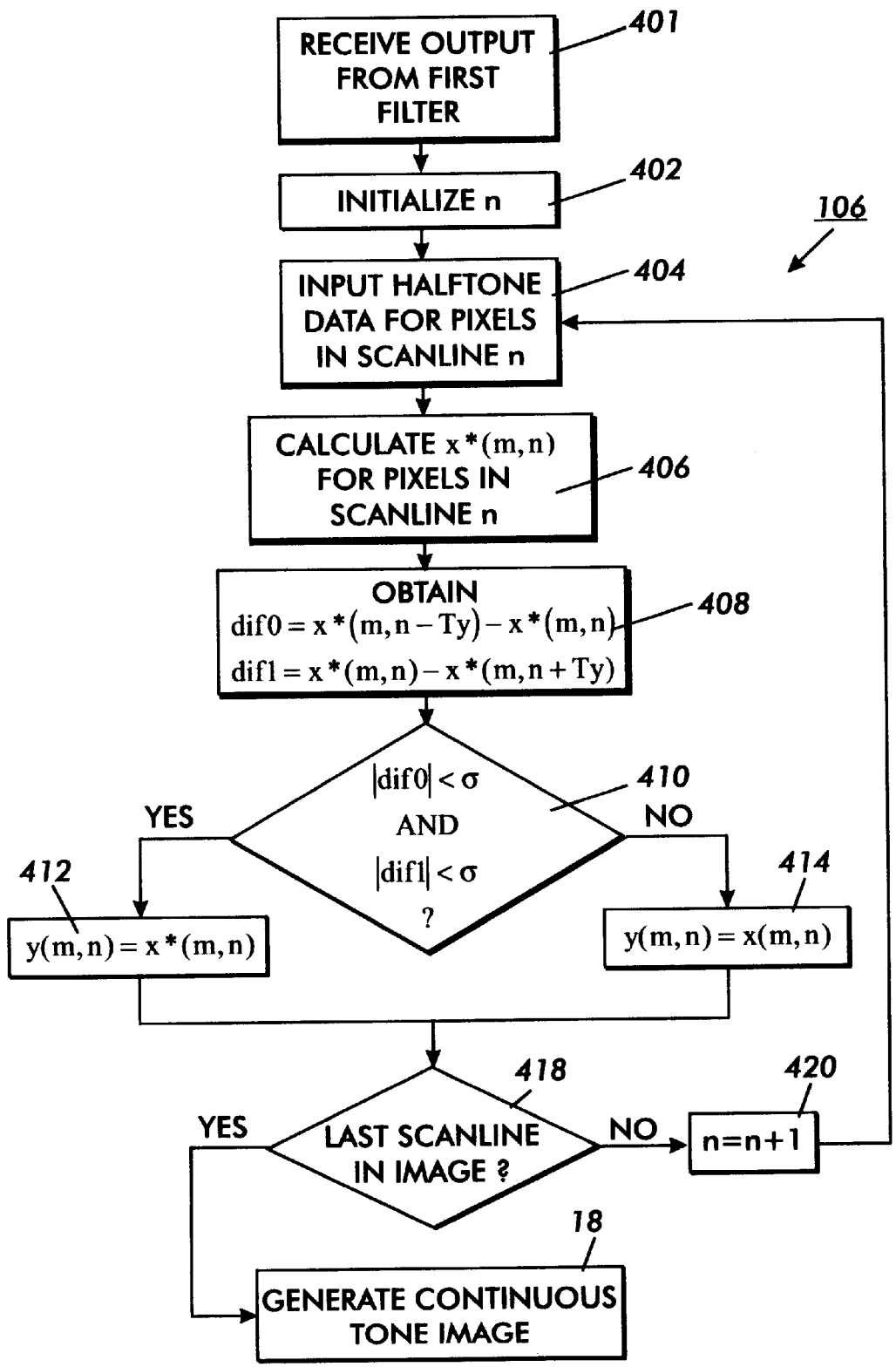
FIG. 5 contains a detailed block diagram illustrating one embodiment of the steps that may be used to implement the second portion of the filter shown in FIG. 2.

Referring now to FIG. 5, the output from filter 104 is received by filter 106 as indicated in block 401. Counter n must be initialized again as indicated in step 402 so that the process begins at the first column of the image. As with filter 104, halftone image data which includes gray level values for each pixel in scanline n is input as indicated in step 404. Functions x(m,n) and y(m,n) still define the input and output of the filter at pixel (m,n).

Turning for a moment to FIG. 8B, pseudo window 706 is again drawn around each pixel 708 in the column, this time in the other direction as shown. Each pseudo-window 706 has a width equal to that of one pixel and a height Ty, and is centered at pixel 708. As those skilled in the art will recognize, the remaining steps of FIG. 5 are very similar to corresponding steps in FIG. 3. The average gray level value of each pseudo window 708 is calculated for all columns in the image as shown in block 406 and difference values for neighboring pixels are calculated as shown in block 408. However as FIG. 8B shows, for this portion of the process the difference values are between the selected pixel and the pixels above and below it, rather than those on either side. Thus as indicated in block 408, the difference values are equal to:

$$dif0=x^*(m,n-T_y)-x^*(m,n)$$

$$dif1=x^*(m,n)-x^*(m,n+T_y)$$

Again, the absolute values of the differences are compared to the provided threshold values as shown in block 410. If pixel (m,n) is in a flat region of the image, i.e. the absolute values of both differences dif0 and dif1 are less than the threshold value a, then output y(m,n) is set equal to x*(m,n) the averaged value of the pseudo-window input as indicated in block 412.

If the absolute values of the differences are not both less than σ, pixel 708 is either on a ridge, in a valley, or on an edge. As before, one embodiment of the invention includes simply eliminating all smoothing and setting output y(m,n) equal to x(m,n) as indicated in block 414. In another embodiment, the more precise location of the "non-flat region" pixels i.e. edge, valley/ridge may be determined, and the output may be set according to that location. This embodiment of the invention is illustrated in FIG. 6.

Still referring to FIG. 5, once the output y(m,n) has been set equal to either x*(m,n) or to x(m,n), we again determine whether all columns in the halftone image have been processed as indicated in block 418. If not, the scanline counter n (more aptly referred to as column counter n here) is incremented and the halftone image data for the next column will be input as shown again in block 404. This continues until output values for the last column in the image have been obtained. At this point the output values have been filtered in two directions, and may be used to output a two dimensional continuous tone image to an appropriate output device as indicated in block 18 also shown in FIGS. 5 and 6.

Figure 6:
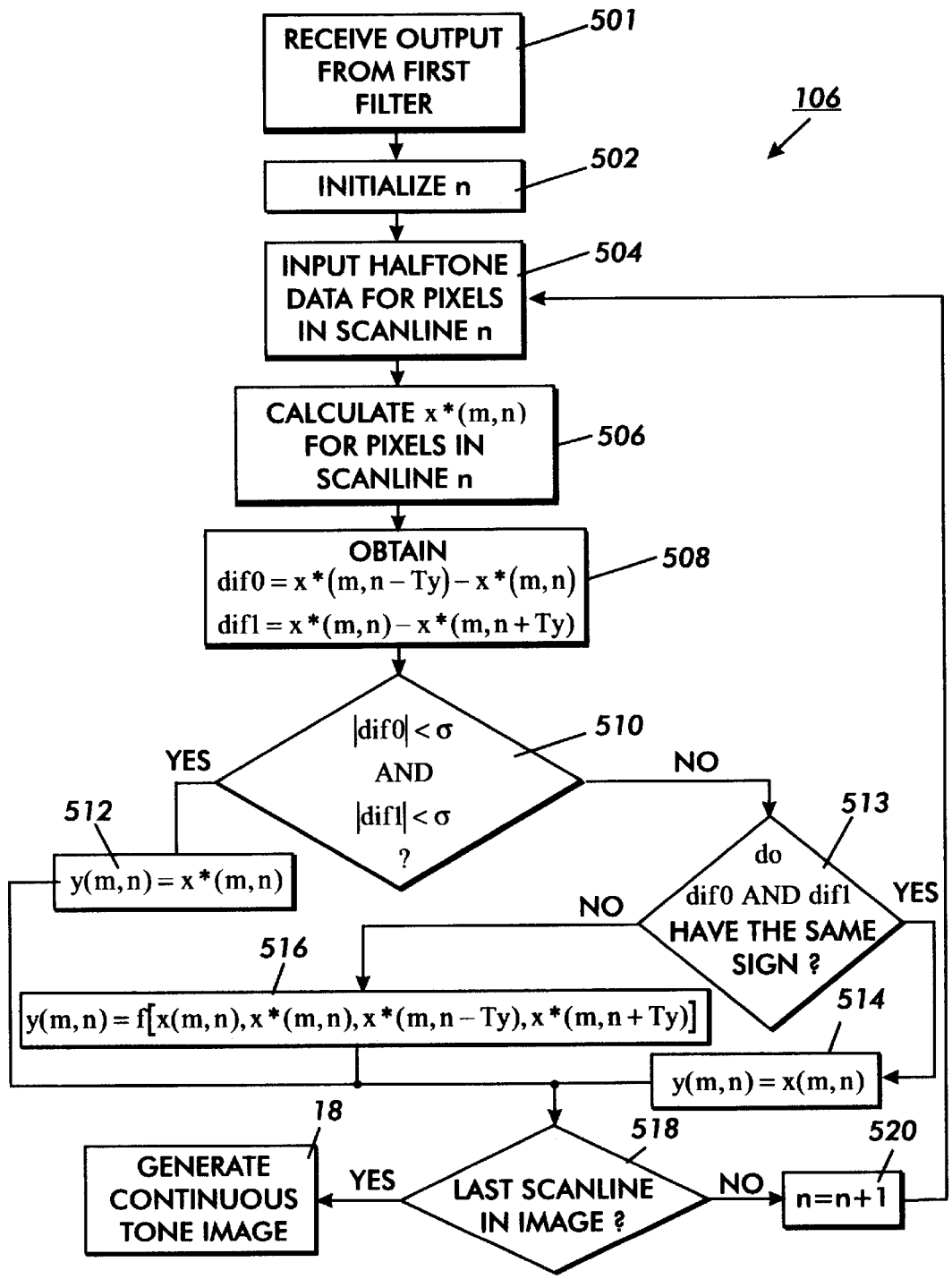
FIG. 6 contains a detailed block diagram illustrating another embodiment of the steps that may be used to implement the second portion of the filter shown in FIG. 2.

With reference now to FIG. 6 as before, one embodiment of filter 106 sets the output of non-flat region pixels at a value that depends upon their location. As those skilled in the art will recognize, this portion of the process is very similar to what has been described with reference to FIG. 4. First whether dif0 and dif1 have the same sign must be determined as indicated in block 513. If so, pixel (m,n) is either in a ridge or in a valley, and the output y(m,n) is set equal to the input x(m,n) for that pixel as shown in block 514. If the absolute values of dif0 and dif1 are not both less than σ AND dif0 and dif1 do not both have the same sign, pixel (m,n) is on an edge of the image. The output value y(m,n) for edge pixels is some function of the input value x(m,n), the averaged value x*(m,n), and the averaged values x*(m, n−$T_y$) and x*(m, n+$T_y$) for pixels as indicated in block 516. The rest of the process continues as described with reference to FIG. 5, incrementing the counter until the entire image has been processed, and then producing the output, which has now been filtered in two directions, as a continuous tone image.

As shown in FIG. 7B, the preferred embodiment of the invention includes setting output values of edge pixels equal to:

$$y(m,n)=\alpha x^*(m,n-T_y)+(1-\alpha)x^*(m,n) \text{ when } |dif0|\leq|dif1| \text{ and } \alpha x^*(m, n+T_y)+(1-\alpha)x^*(m,n) \text{ otherwise}$$

where again, α is a value between 0 and 1 that describes how much edge enhancement is to be applied once an edge has been identified.

It should be appreciated that while the embodiment of the first filter 104 described with reference to FIG. 3 may be paired with the second filter 106 that has been described with reference to FIG. 5, and the embodiment of the first filter 104 described with reference to FIG. 4 may be paired with the second filter 106 described with reference to FIG. 6, these pairings are not required to practice the invention. First filter 104 of FIG. 3 may be paired with second filter 106 of FIG. 6 or any other possible embodiment of the invention. The same goes for first filter 104 of FIG. 4. The output of the present invention can be used to produce an output image on a printer or other suitable output device, such as a monitor. The output image may also be stored in a computer memory.

It is, therefore, apparent that there has been provided in accordance with the present invention, a method and apparatus for creating a continuous tone image from halftone data that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of outputting a continuous tone image comprising the steps of:

a) acquiring the halftone digital image data;

b) filtering the halftone image in two directions to produce a two-dimensional filtered output; and c) producing a continuous tone output image from said two-dimensional filtered output, wherein said filtering step further comprises:

a) operating a one-dimensional filter on the halftone digital image data in a first direction to produce a continuous tone first filter output; and b) operating a one-dimensional filter on said continuous tone first filter output in a second direction to produce a continuous tone second filter output, wherein said first direction filter operating step further comprises:

a) inputting gray level value signals for pixels in a line;

b) inputting a threshold value signal;

c) selecting a pixel and generating a selected pixel pseudo-window which is approximately centered at said selected pixel, wherein said selected pixel pseudo-window includes at least one pixel adjacent to said selected pixel;

d) determining an average gray level signal for all pixels in said selected pixel pseudo-window;

e) creating adjacent pixel pseudo-windows that are approximately centered at pixels adjacent to said selected pixel and determining average gray level value signals for said adjacent pixel pseudo-windows;

f) calculating at least first and second difference value signals, wherein said first difference value signal indicates a difference between said selected pixel pseudo-window gray level average value signal and a first adjacent pixel pseudo-window gray level average value signal, and said second difference value signal indicates a difference between said selected pixel pseudo-window gray level average value signal and a second adjacent pixel pseudo-window gray level average value signal;

g) comparing said difference value signals to said threshold value signal; and h) assigning continuous tone output values to said pixels based upon said threshold value comparison.

2. A method of outputting a continuous tone image as claimed in claim 1 further comprising setting a selected pixel output signal equal to said selected pixel pseudo-window gray level average value signal if both said first difference value signal and said second difference value signal have absolute values less than said threshold value signal.

3. A method of outputting a continuous tone image as claimed in claim 1 further comprising setting a selected pixel output signal equal to said selected pixel input value if either said first difference value signal or said second difference value signal, or both said first difference value signal and said second difference value signal have absolute values greater than said threshold value signal, and both said first difference value signal and said second difference value signals have the same sign polarity.

4. A method of outputting a continuous tone image as claimed in claim 1 further comprising setting a selected pixel output signal equal to a function of said selected input pixel value signal said selected pixel pseudo-window average gray level signals, and said adjacent pixel pseudo-window average gray level signals if either said first difference value signal or said second difference value signal, or both said first difference value signal and said second difference value signal have absolute values greater than said threshold value signal, and said first difference value signal and said second difference value signal do not have the same sign polarity.

5. A method of outputting a continuous tone image as claimed in claim 4 wherein said selected pixel output signal function y(m,n) is equal to:

$$y(m,n)=\alpha(m-T_x,n)+(1-\alpha)x^*(m,n)$$

if the absolute value of said first difference value is less than or equal to the absolute value of said second difference value and $$y(m,n)=\alpha x^*(m+T_x,n)+(1-\alpha)x^*(m,n)$$

if the absolute value of said first difference value is greater than the absolute value of said second difference value, where (m, n) defines a location of said selected pixel, $\alpha$ indicates a desired amount of edge enhancement for said image, $x^*$ is an averaged gray level input value for a pseudo-window surrounding an associated pixel, and $T_x$ is a measure of a length of said pseudo-window in a direction along said line.

6. A method of outputting a continuous tone image as claimed in claim 1 wherein said generated selected pixel pseudo-window has a length in a direction of said line equal to a closest integer of said screen frequency width, and a length orthogonal to said line equal to that of one pixel.

7. A method of outputting a continuous tone image from halftone digital image data comprising:
 a) acquiring the halftone digital image data;
 b) filtering the halftone image in a first direction to produce a first filtered output image;
 c) filtering said first filtered output image in a second direction to produce a second filtered output; and
 d) producing a continuous tone output image from said second filtered output,
 wherein said first direction filtering step further comprises:
  a) inputting gray level value signals for pixels in a line;
  b) inputting a threshold value signal;
  c) selecting a pixel and generating a selected pixel pseudo-window which is approximately centered at said selected pixel, wherein said selected pixel pseudo-window includes at least one pixel adjacent to said selected pixel;
  d) determining an average gray level signal for all pixels in said selected pixel pseudo-window;
  e) creating adjacent pixel pseudo-windows that are approximately centered at pixels adjacent to said selected pixel and determining average gray level value signals for said adjacent pixel pseudo-windows;
  f) calculating at least first and second difference value signals, wherein said first difference value signal indicates a difference between said selected pixel pseudo-window gray level average value signal and a first adjacent pixel pseudo-window gray level average value signal, and said second difference value signal indicates a difference between said selected pixel pseudo-window gray level average value signal and a second adjacent pixel pseudo-window gray level average value signal;
  g) comparing said difference value signals to said threshold value signal; and
  h) assigning continuous tone output values to said pixels based upon said threshold value comparison.

8. A method of outputting a continuous tone image as claimed in claim 7 further comprising setting a selected pixel output signal equal to said selected pixel pseudo-window gray level average value signal if both said first difference value signal and said second difference value signal have absolute values less than said threshold value signal.

9. A method of outputting a continuous tone image as claimed in claim 7 further comprising setting a selected pixel output signal equal to said selected pixel input value if either said first difference value signal or said second difference value signal, or both said first difference value signal and said second difference value signal have absolute values greater than said threshold value signal, and both said first difference value signal and said second difference value signals have the same sign polarity.

10. A method of outputting a continuous tone image as claimed in claim 7 further comprising setting a selected pixel output signal equal to a function of said selected input pixel value signal said selected pixel pseudo-window average gray level signals, and said adjacent pixel pseudo-window average gray level signals if either said first difference value signal or said second difference value signal, or both said first difference value signal and said second difference value signal have absolute values greater than said threshold value signal, and said first difference value signal and said second difference value signal do not have the same sign polarity.

11. A method of outputting a continuous tone image as claimed in claim 10 wherein said selected pixel output signal function is equal to:

$$y(m,n)=\alpha x^*(m-T_x,n)+(1-\alpha)x^*(m,n)$$

if the absolute value of said first difference value is less than or equal to the absolute value of said second difference value and $$y(m,n)=\alpha x^*(m+T_x,n)+(1-\alpha)x^*(m,n)$$

if the absolute value of said first difference value is greater than the absolute value of said second difference value, where (m, n) defines a location of said selected pixel, $\alpha$ indicates a desired amount of edge enhancement for said image, $x^*$ is an averaged gray level input value for a pseudo-window surrounding an associated pixel, and $T_x$ is a measure of a length of said pseudo-window in a direction along said line.

12. A method of outputting a continuous tone image as claimed in claim 7 wherein said generated selected pixel pseudo-window has a width equal to a closest integer of said screen frequency width, and a height equal to that of one pixel.

13. An apparatus for outputting a continuous tone image from halftone digital image data, comprising:
 a) means for acquiring the halftone digital image data;
 b) means for filtering the halftone image in a first direction to produce a first filtered output image;
 c) means for rotating said first filtered output image by a specified angle;

d) means for filtering said first filtered output image in a second direction to produce a second filtered output; and
e) means for producing a continuous tone output image from said second filtered output, wherein said filtering means further comprises:
- a) means for inputting gray level value signals for pixels in a line;
- b) means for inputting a threshold value signal;
- c) means for selecting a pixel and generating a selected pixel pseudo-window which is approximately centered at said selected pixel, wherein said selected pixel pseudo-window includes at least one pixel adjacent to said selected pixel;
- d) means for determining an average gray level signal for all pixels in said selected pixel pseudo-window;
- e) means for creating adjacent pixel pseudo-windows that are approximately centered at pixels adjacent to said selected pixel and determining average gray level value signals for said adjacent pixel pseudo-windows;
- f) means for calculating at least first and second difference value signals, wherein said first difference value signal indicates a difference between said selected pixel pseudo-window gray level average value signal and a first adjacent pixel pseudo-window gray level average value signal, and said second difference value signal indicates a difference between said selected pixel pseudo-window gray level average value signal and a second adjacent pixel pseudo-window gray level average value signal;
- g) means for comparing said difference value signals to said threshold value signal; and
- h) means for assigning continuous tone output values to said pixels based upon said threshold value comparison.

* * * * *